April 19, 1927. 1,625,324
M. H. LOUGHRIDGE
VALVE FOR REFRIGERATING APPARATUS
Filed May 11, 1926 2 Sheets-Sheet 1
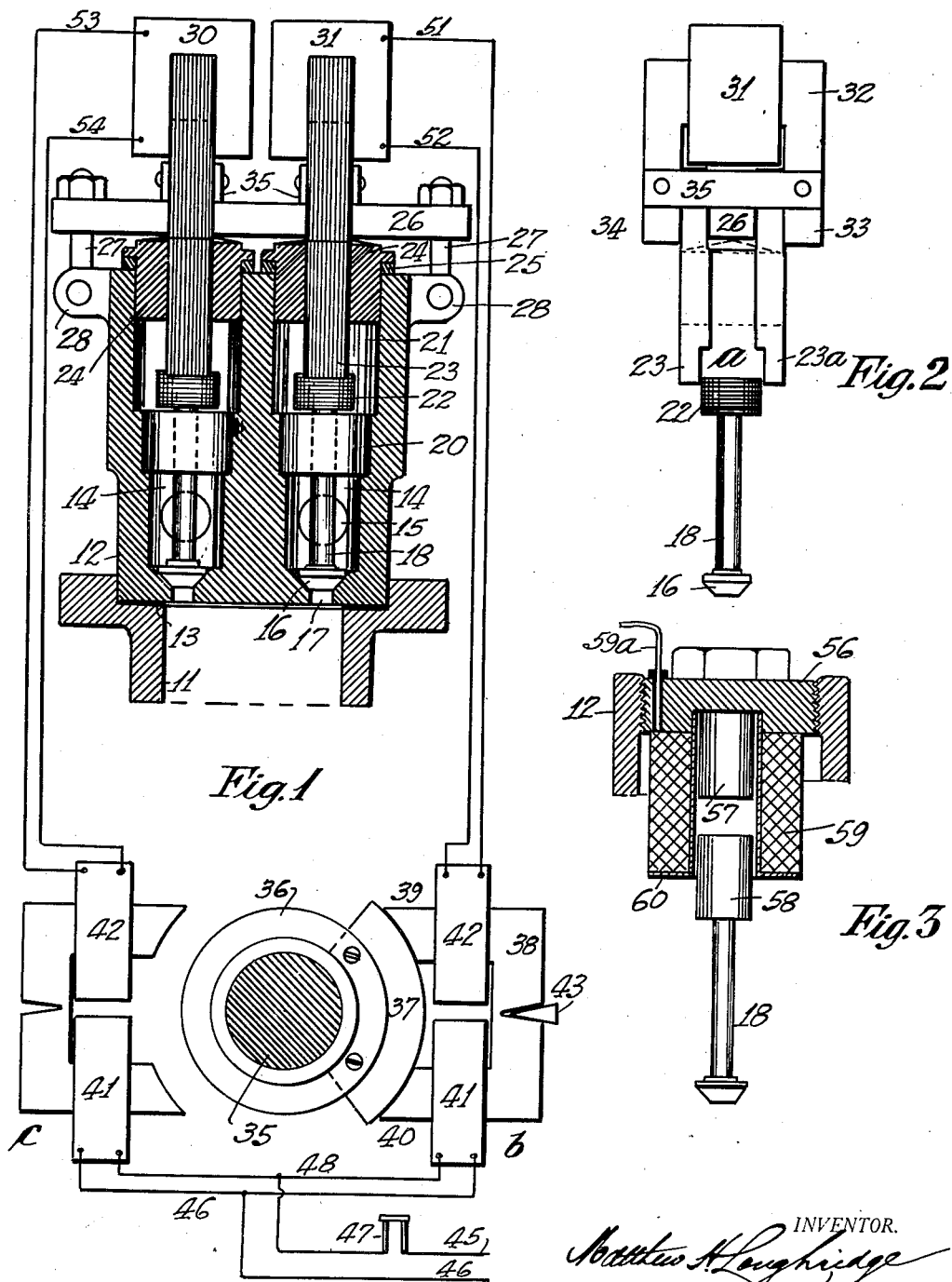

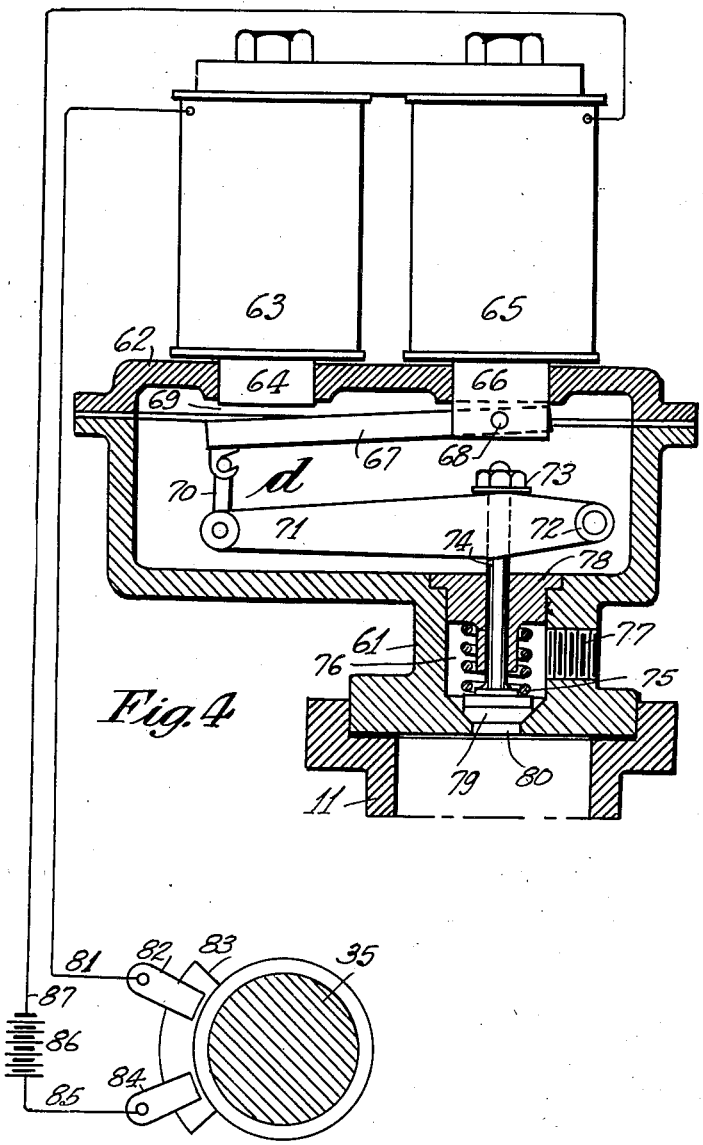

Patented Apr. 19, 1927.

UNITED STATES PATENT OFFICE.

MATTHEW H. LOUGHRIDGE, OF BOGOTA, NEW JERSEY.

VALVE FOR REFRIGERATING APPARATUS.

Application filed May 11, 1926. Serial No. 108,432.

This invention relates to refrigerating apparatus and it relates more particularly to the valves used in refrigerating systems, and has for an object to provide valves operated by other means than a spring or by suction which are entirely enclosed and in which there are no moving parts exterior to the valves; a further object of the invention is to provide a valve for this purpose controlled from the exterior of the valve chamber without the use of stuffing boxes and another object of the invention is to operate valves in a refrigerating system by electro-magnetic induction. Other objects of the invention will appear from the following specification and the accompanying drawings, in which Fig. 1, is a sectional elevation of a valve head with the controlling apparatus embodying my invention, Fig. 2 is a detail of the apparatus in Fig. 1, Fig. 3 is another form of valve magnet that may be used in carrying out my invention and Fig. 4 is another arrangement showing a magnet and lever operated valve that may be used in carrying out this invention.

In machines built for mechanical refrigeration, valves are required in the circulating system to control the flow of the refrigerant. In certain places these valves are automatic in operation, being held closed by a spring and opened by suction and in these cases the valve does not require any mechanical connections for its operation so that it can be entirely enclosed and leaks at the valve are thereby avoided. In other constructions the valves are mechanically operated by cams and connecting rods which must enter the valve housing either by a sliding or rotary action. Stuffing boxes are usually provided for the stem of the valve, or the operating rod where it passes through the valve housing in order to prevent leakage at this point. The present invention is directed to the operation of these valves without the use of a moving member passing through the valve housing.

Mechanical refrigerators operate by pressure and are required to operate for lengthened periods without attention. The refrigerating medium is often poisonous and generally has an offensive odor, besides being corrosive in its action. It is therefore important that leaks be avoided and the possibility of leaks be guarded against. The present invention secures this result by eliminating the stuffing boxes and the moving parts passing through the valve housing and substituting therefor a magnetic field which is created outside and controlled outside the valve housing. This arrangement eliminates all moving parts except the valve itself, reduces noise, vibration and wear and simplifies the mechanical construction of the machine.

This invention also includes an arrangement of inductively coupled coils that may be used with alternating current to control the operation of the valves instead of a circuit controller.

Referring to the drawings, 11 is the head of a cylinder of a refrigerating machine, 12 is the valve head secured to 11 through the gasket 13, 14 is the valve chamber which has an outlet at 15 connecting with the refrigerating system; 16 is the valve seating in the head 12 and closing the orifice 17 to the cylinder 11. The valve stem 18 passes through the guide 20 and terminates in the laminated cylindrical head 22 in chamber 21, which moves in the space $a$ between the laminated poles 23 and 23$^a$, Fig. 2. As these poles are magnetized the head 22 is drawn upwards thereby lifting the valve and establishing communication between the chamber 14 and the cylinder 11.

The chamber 21 is closed by the plug 24 with a sealed joint through the gasket 25. These plugs are held in place by the bar 26 and the bolts 27 which, through the lugs 28, firmly bind the plugs in place. The head 12 is made from non-magnetic material such as brass and the plugs 24 are also made from non-magnetic material. Embedded in each plug is the laminated poles 23—23$^a$ so that mechanically the plug and these poles are an integral part, sealed together with an air-tight seal and the chamber 21 is thus closed with a removable air-tight closure.

The coil 31 is placed on the magnetic yoke 32 and has pole 33 aligning with the pole 23$^a$, and the pole 34 aligning with the pole 23. The poles 23 and 23$^a$ pass inside the poles 33—34 and are held in alignment therewith by the non-magnetic straps 35. It is apparent that the poles of the yoke 32 are continued in the poles 23 and 23$^a$ and that energizing the coil 31 creates a magnetic field which lifts the valve 16. The magnetic yoke 32 is detachable by sliding upwards. In the operative position the straps 35 rest upon the non-magnetic bar 26 as shown.

In the arrangement shown in Fig. 1, a pair of similar valves with corresponding parts are shown controlled by the magnet coils 30 and 31. This corresponds with the mechanism shown in application, Serial No. 27,071, filed April 30, 1925, to which reference is made by permission. It should be understood however, that the valve arrangement in this invention may be applied to various types or systems of refrigeration and is not confined to a specific type.

An arrangement for operating the valve magnets is shown in Fig. 1. The shaft of the refrigerating machine is indicated by 35. This shaft operates the elements of the compressor which are not shown in the drawing. The collar 36 is mounted on this shaft and supports the segmental laminations 37 which are thereby carried around by the shaft. The yoke of a transformer 38 with legs 39 and 40 is arranged to align with 37 so that 37 completes the magnetic circuit of the transformer as indicated to the right. A primary coil 41 connected with a source of electric supply through wires 45, 46 thermostatic controller 47 and wire 48, is inductively coupled with the secondary coil 42, which, when 37 completes the magnetic circuit of the transformer, energizes coil 31 through wires 51 and 52. When 37 moves away from the legs 39 and 40, coil 31 is substantially deenergized. It will thus be noted that 37 takes the place of the operating cam for the valve, holding the valve open when in a predetermined position with relation to transformer 38 and 37 is, accordingly, shaped as may be necessary to secure the desired operation of the valve. The magnetic circuit of the yoke 38 may be varied by the adjustable wedge 43 as shown.

A pair of transformers are provided as shown, indicated by $b$ and $c$. The transformer $c$ energizes coil 30 through wires 53 and 54 in the manner described as revolving laminations corresponding to 37 close the magnetic circuit of the transformer. This arrangement is preferred to a contacting segment as there is no arcing and there are no contacts to be kept in order.

In the modified construction in Fig. 3 a solenoid type of magnet is used which is enclosed within the valve housing and so arranged that the valve stem forms the plunger of the solenoid. In the drawing, 56 is a cap which is screwed into the valve head 12 and carries the iron core 57 and the coil 59 which is supported by the form 60. The electrical connections for the coil 59 are led through the cap 56 by an insulated air tight seal as indicated at $59^a$. The valve stem 18 terminates in the plunger 58 in the core of the coil 59 and is raised within the core each time the coil is energized. In this construction the entire electrical parts are protected by the valve housing.

In the arrangements described the plunger of the valve is the only moving element and is directly operated by the magnet. In Fig. 4 an arrangement of levers are provided operated by a horse-shoe magnet which may be used where the electrical force is limited, or where the lift of the valve requires considerable force. This arrangement comprises the valve head 61 seated on the cylinder 11 and having a sealed cover 62 which supports the magnet coil 63 through the pole piece 64 and supports the magnet coil 65 through the pole piece 66. These pole pieces are magnetic iron and are inserted in the non-magnetic cover 62 with an air tight seal so that the magnetic field created by the coils is available in chamber $d$. The armature 67 is pivoted in the pole piece 66 at 68 and aligns with the pole 64. In this arrangement the only air gap in the magnetic circuit is at 69.

By a link 70 the outer end of the armature 67 is pivotally connected with the valve lever 71 which moves on a fixed pivot at 72 and engages the valve stem 74 through the nut and washer 73 so that an upward movement of the lever will lift the valve 79 and open the orifice 80 into the cylinder. The valve stem moves through a guide 78 and is normally seated by the spring 75 in chamber 76. An outlet from chamber 76 is provided at 77. It is apparent that any leakage from chamber 76 around the valve stem cannot escape from the sealed chamber $d$.

The coils 63—65 may be energized from battery 86, through wire 81, contact 82, segmental contact 83 rotated by shaft 35, contact 84 and wires 85 and 87.

Attention is called to the fact that the valve as shown in Figs. 1 and 2, is provided with a round laminated head which fits a corresponding aperture $a$, between the poles 23—$23^a$ these parts being centered on the vertical axis of the valve so that the valve or the poles are free to rotate independently of each other.

The seal between the poles and the housing of the valve may be effected by moulding the poles into the housing, or by pouring a sealing medium between these parts, or by a gasket construction, or other means adopted in the mechanical arts for securing a seal under similar conditions.

Having thus described my invention, I claim:

1. An electrically operated valve comprising an air tight housing with a valve seated in said housing, a magnetic stem for said valve, a pair of magnetic poles on either side of said stem and between which said stem can move passing through said housing and detachable means exterior to said housing for magnetizing said poles for unseating said valve.

2. An electrically operated valve comprising an air tight housing with a valve seated in said housing, a magnetic stem for said valve, a pair of poles magnetically influencing said stem and passing through said housing, a magnetic yoke having poles engaging said first mentioned poles and means for energizing said yoke.

3. An electrically operated valve comprising an air tight housing with a valve seated in said housing, a magnetic member rigidly connected with said valve, a pair of poles passing through said housing and a magnetic yoke separate from said poles having an energizing coil and poles aligning with said first mentioned poles whereby said valve is unseated magnetically.

4. An electrically operated valve comprising an air tight housing with a valve seated in said housing, a magnetic member rigidly connected with said valve, a pair of poles associated with said magnetic member passing through and projecting beyond said housing, and a magnetic yoke having an energizing coil and legs aligning with said projections whereby said valve is unseated magnetically.

5. In an electrically operated valve, the combination, an air tight housing having a valve seated therein, a magnetic member connected with said valve, a pair of poles associated with said magnetic member passing through and projecting beyond said housing, a magnetic yoke having an energizing coil straddling said projections and means for holding said yoke and projections in alignment.

6. In an electrically operated valve, the combination, an air tight housing having a valve seated therein, a magnetic member connected with said valve, a pair of poles associated with said magnetic member passing through and projecting beyond said housing and a magnetic yoke with an energizing coil and poles aligning with said projections detachably secured to said projections.

7. In a refrigerating system, the combination of a mechanism including a valve, a magnet for operating said valve, a transformer for energizing said magnet and rotating means embodied in said mechanism for varying the magnetic circuit of said transformer.

8. In a refrigerating system, the combination of a mechanism comprising a shaft and a valve, a magnet for operating said valve, a transformer for energizing said magnet and a laminated cam carried by said shaft for varying the magnetic circuit of said transformer.

9. In a refrigerating system, the combination of a mechanism comprising a rotating shaft and a valve, a magnet for operating said valve, and a transformer for said magnet, said shaft controlling the magnetic circuit of said transformer.

In testimony whereof I affix my signature.

MATTHEW H. LOUGHRIDGE.